G. A. PARMENTER.
LIFE GUARD FOR RAILWAY CARS.
APPLICATION FILED MAR. 27, 1909.
1,014,667.
Patented Jan. 16, 1912.
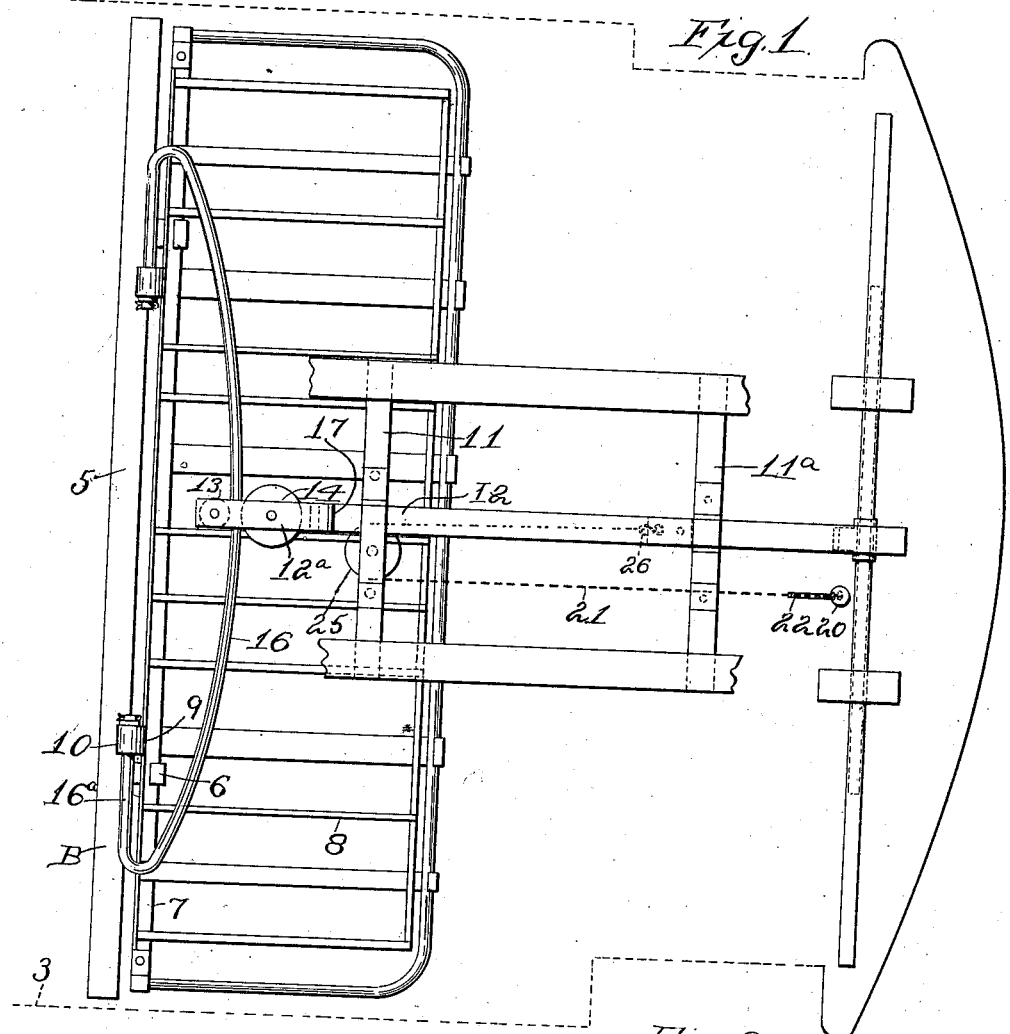
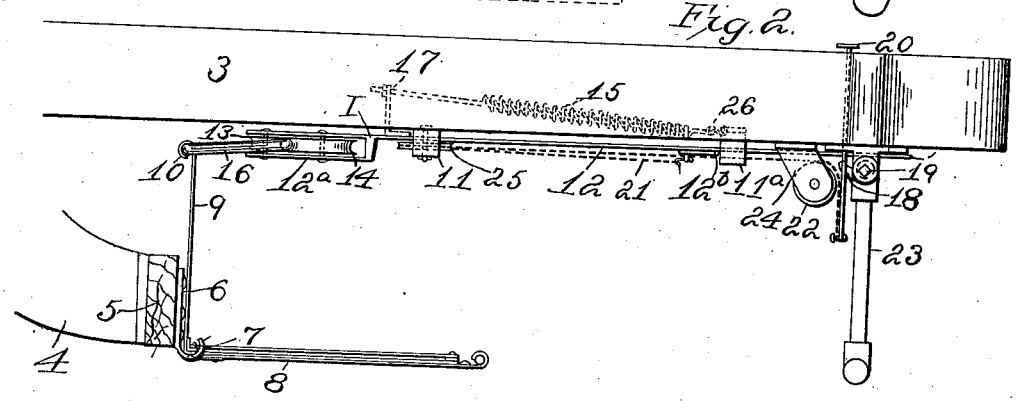
ATTEST.
INVENTOR.
GEORGE A. PARMENTER

UNITED STATES PATENT OFFICE.

GEORGE A. PARMENTER, OF CAMBRIDGE, MASSACHUSETTS.

LIFE-GUARD FOR RAILWAY-CARS.

1,014,667.   Specification of Letters Patent.   Patented Jan. 16, 1912.

Application filed March 27, 1909. Serial No. 486,136.

*To all whom it may concern:*

Be it known that I, GEORGE A. PARMENTER, citizen of the United States, residing at Cambridge, Massachusetts, have invented certain new and useful Improvements in Life-Guards for Railway-Cars, of which the following is a specification.

My invention relates to improvements in fenders or guards for railway cars of the type known as trip and drop scoop, and is particularly designed for use on double or swinging truck cars. As the position of the truck changes with relation to the car body, in rounding curves, it is necessary to provide compensating or equalizing devices between the trip and scoop. A fender or guard having such means for maintaining the proper relation between the parts is claimed broadly in Letters Patent of the United States, granted to me on the 25th day of April 1899, Number 623818.

In devising the present improvements I have aimed to reduce the number of parts to a minimum, thereby securing greater economy in manufacture, and durability in use; to produce a fender which shall be more quick and positive in its action; to do away as far as possible with obstructions on the pilot board of the truck, and to provide means by which the fender may after tripping, be reset from the car platform if desired.

With these and other objects in view the invention includes the novel features of construction and arrangement and combination of parts hereinafter described and particularly pointed out in the appended claims.

An embodiment of the invention is illustrated in the accompanying drawing in which, Figure 1 is a plan view, showing a sufficient portion of the car platform in outline, to illustrate the application of the improved fender thereto, and Fig. 2 is a side elevation.

Referring by reference characters to this drawing the numeral 3, designates the sill of the car body, and 4 the truck frame. The usual front cross bar or pilot board is shown at 5, provided with brackets or hangers 6 with hooked portions or recesses in which the cross bar or member 7 of the scoop 8 is pivotally or rotatably seated. The scoop is provided with upwardly extending arms 9, preferably of spring or resilient material to relieve the connections of strain due to shocks and jars, to the upper ends of which arms are connected the ends of the curved bar 16 which I call the radius bar, and which is formed in the shape of an arc of a circle concentric with the axis of the truck. The ends of the bar are preferably turned inward, as shown at $16^a$, so as to give a maximum length to the curved portion, and are pivotally connected to the arms 9, preferably by engaging eyes 10 in the upper ends thereof.

Mounted to slide in suitable hangers 11 and $11^a$, beneath the platform of the car, is a bar 12 which is provided at its rear end with means for effecting a sliding engagement with the curved bar 16. The preferred means of effecting this engagement is to provide a fork $12^a$ on the rear end of the bar, between the arms of which are journaled a pair of pulleys 13 and 14, bearing on opposite sides of the curved bar. The bar 12 is provided with a lug or projection $12^b$ which is designed to normally abut against the rear side of the bracket or hanger $11^a$ and thus to hold the bar in its rearward position and the scoop elevated as shown in Fig. 2. The bar 12 is adapted to be raised so as to cause the projection to clear the bottom of the hanger when said bar is free to slide forward, the curved bar and arms moving forward at the same time, and the scoop dropping into contact with the road bed to pick up any object which may lie thereon. While ordinarily the weight of the scoop will cause it to drop very quickly, the action of gravity may be assisted by a spring 15, one end of which may be connected to a stationary part such as the bracket $11^a$, while its other end is connected to a bracket 17 on the sliding bar. The sliding bar is designed to be raised to disengage its projection from the hanger by an arm or projection 18 carried by the cross shaft 19 of the trip frame 23. It will thus be seen that if an obstacle be encountered on the track, it will swing the trip frame rearwardly, and the projection 18 upwardly, thus raising the bar to disengage its locking or holding projection from the bracket, when the action of gravity or the combined action of gravity and the spring will drop the scoop instantly to the track to pick up the obstacle thereon.

It is sometimes considered desirable to provide means by which the parts, after having been tripped, as above described, may be reset by the motorman without necessitating his leaving the platform. As a convenient means of effecting this, I have shown a foot treadle 20 adapted to be depressed by the foot of the motorman. To the lower end of this is connected a chain or its equivalent 21, which is carried up over a pulley 22, journaled in a hanger 24. The chain is then carried rearwardly around a pulley 25, journaled in bracket 11, and thence forward for a suitable distance, and connected by an attaching device such as a hook 26 on the sliding bar.

Having thus described my invention, what I claim is—

1. The combination with a car body and swiveled truck frame, of a movable bar carried by the car body, a scoop pivotally supported from the truck frame, a curved bar pivotally connected with the scoop, antifriction rollers on the movable bar engaging said curved bar, means for normally holding the movable bar against movement, and tripping means for releasing said bar from the holding means.

2. The combination with a car, of a pivoted scoop having upwardly extending resilient arms, a sliding bar, means connecting the rear end of the sliding bar with said resilient arms, means for locking the bar normally against movement, and a trip device for releasing the bar.

3. In combination with a car body and swiveled truck frame, of a movable bar carried by the car body, a scoop pivotally supported from the truck frame and having upwardly extending resilient arms, a curved bar, and a part having a sliding engagement with said bar, one of said elements being connected with said resilient arms and the other with the movable bar, means for locking said bar against movement, and releasing means.

4. The combination with a car body and swiveled truck frame, of a movable bar carried by the car body, a scoop pivotally supported from the truck frame, and having upwardly extending resilient arms, a curved bar having its ends pivotally connected with said resilient arms and having a sliding connection with said movable bar, means for normally locking said bar against movement, and tripping means for releasing it.

5. The combination with a car body and truck frame, of a scoop pivotally supported from the truck frame and having upwardly extending resilient means for holding the scoop elevated, mechanism connected with said means and normally locked to hold the scoop elevated and tripping means.

6. The combination with a car, of a pivoted scoop having a part extending above the pivot, a sliding bar having its rear end in operative connection with the upwardly extending part of the scoop, a spring exerting tension on said bar and tending to move it in a direction to depress the scoop, an abutment coöperating with a projection on the bar, and tending to hold the bar normally against longitudinal movement, and a rocking trip device having an arm adapted to cause relative displacement between the projection on the sliding bar and the abutment to unlock the sliding bar, substantially as described.

7. The combination with a car body and swiveled truck frame, of a movable bar carried by the car body, a spring exerting tension on said bar, a scoop pivotally supported from the truck frame, and having upwardly extending resilient arms, a curved bar having its ends pivotally connected with said resilient arms and having a sliding connection with said movable bar, means for normally locking said bar against movement, and tripping means for releasing it.

In testimony whereof, I affix my signature in presence of two witnesses.

GEORGE A. PARMENTER.

Witnesses:
HENRY E. COOPER,
IRA L. PARK.

Copies of this patent may be obtained for five cents each, by addressing the "Commissioner of Patents, Washington, D. C."